United States Patent
Favreau

(10) Patent No.: US 12,241,558 B2
(45) Date of Patent: Mar. 4, 2025

(54) FLOW FUSE VALVE AND METHOD OF ASSEMBLY THEREOF

(71) Applicant: The Lee Company, Westbrook, CT (US)

(72) Inventor: Micahia Blaise Favreau, Norwich, CT (US)

(73) Assignee: THE LEE COMPANY, Westbrook, CT (US)

( * ) Notice: Subject to any disclaimer, the term of this patent is extended or adjusted under 35 U.S.C. 154(b) by 165 days.

(21) Appl. No.: 17/576,628

(22) Filed: Jan. 14, 2022

(65) Prior Publication Data
US 2022/0221073 A1 Jul. 14, 2022

Related U.S. Application Data

(60) Provisional application No. 63/137,510, filed on Jan. 14, 2021.

(51) Int. Cl.
*F16K 15/06* (2006.01)

(52) U.S. Cl.
CPC .................. *F16K 15/063* (2013.01)

(58) Field of Classification Search
CPC ......... F16K 1/126; F16K 17/30; F16K 15/063
See application file for complete search history.

(56) References Cited

U.S. PATENT DOCUMENTS

| | | | |
|---|---|---|---|
| 2,179,144 A | 11/1939 | Buttner | |
| 3,379,213 A * | 4/1968 | Billington | F16K 27/07 137/543.17 |
| 3,741,241 A | 6/1973 | Jackson | |
| 3,794,077 A | 2/1974 | Fanshier | |
| 3,872,884 A | 3/1975 | Busdiecker et al. | |
| 4,436,111 A | 3/1984 | Gold et al. | |
| 5,105,850 A | 4/1992 | Harris | |
| 5,293,898 A * | 3/1994 | Masloff | F16K 17/30 137/498 |
| 5,379,797 A | 1/1995 | Rogers et al. | |
| 10,253,899 B2 | 4/2019 | Wang | |
| 2012/0160346 A1* | 6/2012 | Shelcoviz | F16K 1/126 137/517 |

\* cited by examiner

*Primary Examiner* — P. Macade Nichols
(74) *Attorney, Agent, or Firm* — CANTOR COLBURN LLP

(57) ABSTRACT

A flow fuse valve configured to be installed inline within a primary flow channel section having an interior wall, a first flow region, and a second flow region, the flow fuse valve having: a valve body; a poppet assembly disposed within the valve body, the poppet assembly having: a first poppet section; a second poppet section; a resilient seal member disposed and captured between the first poppet section and the second poppet section, wherein the first and second poppet sections are securely fastened with respect to each other subsequent to the resilient seal member being captured therebetween; and a resilient biasing member disposed between the first poppet section and the valve body 100 that is configured to bias the poppet assembly toward an open-valve position; wherein the resilient seal member and the valve body are configured to form a fluid flow seal in response to the poppet assembly being disposed in a closed-valve position via an abrupt fluid pressure drop in the primary flow channel section downstream of the flow fuse valve, wherein the fluid flow is from the first flow region toward the second flow region.

38 Claims, 10 Drawing Sheets

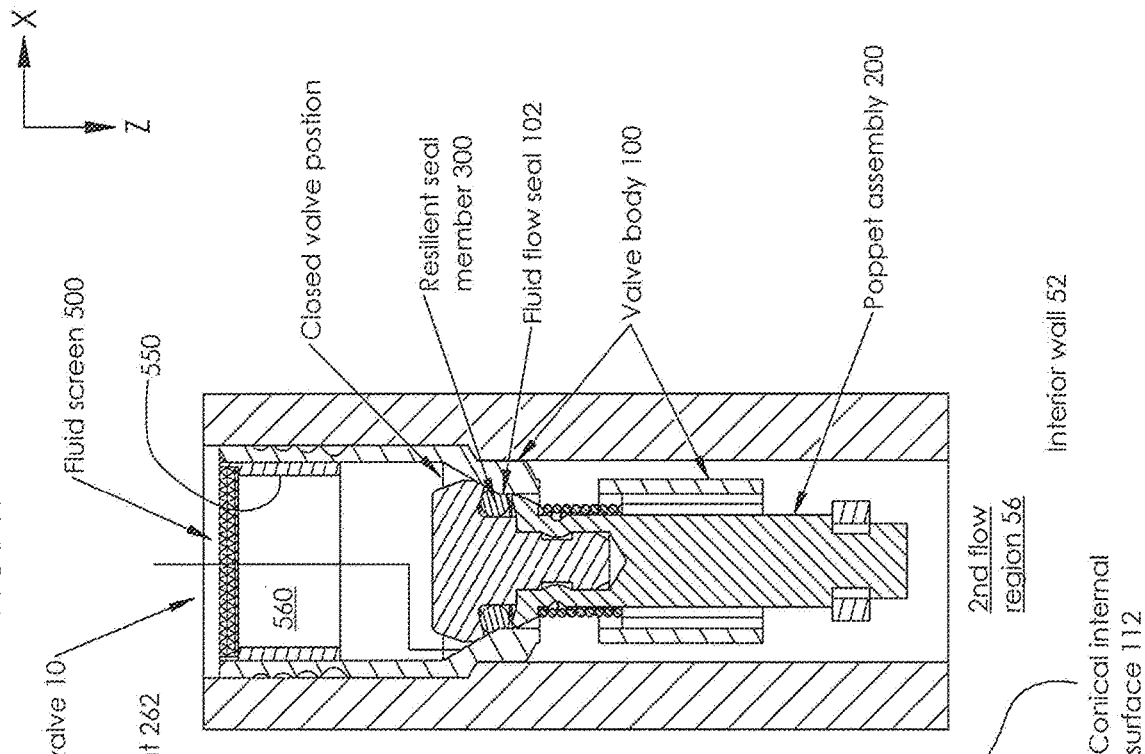
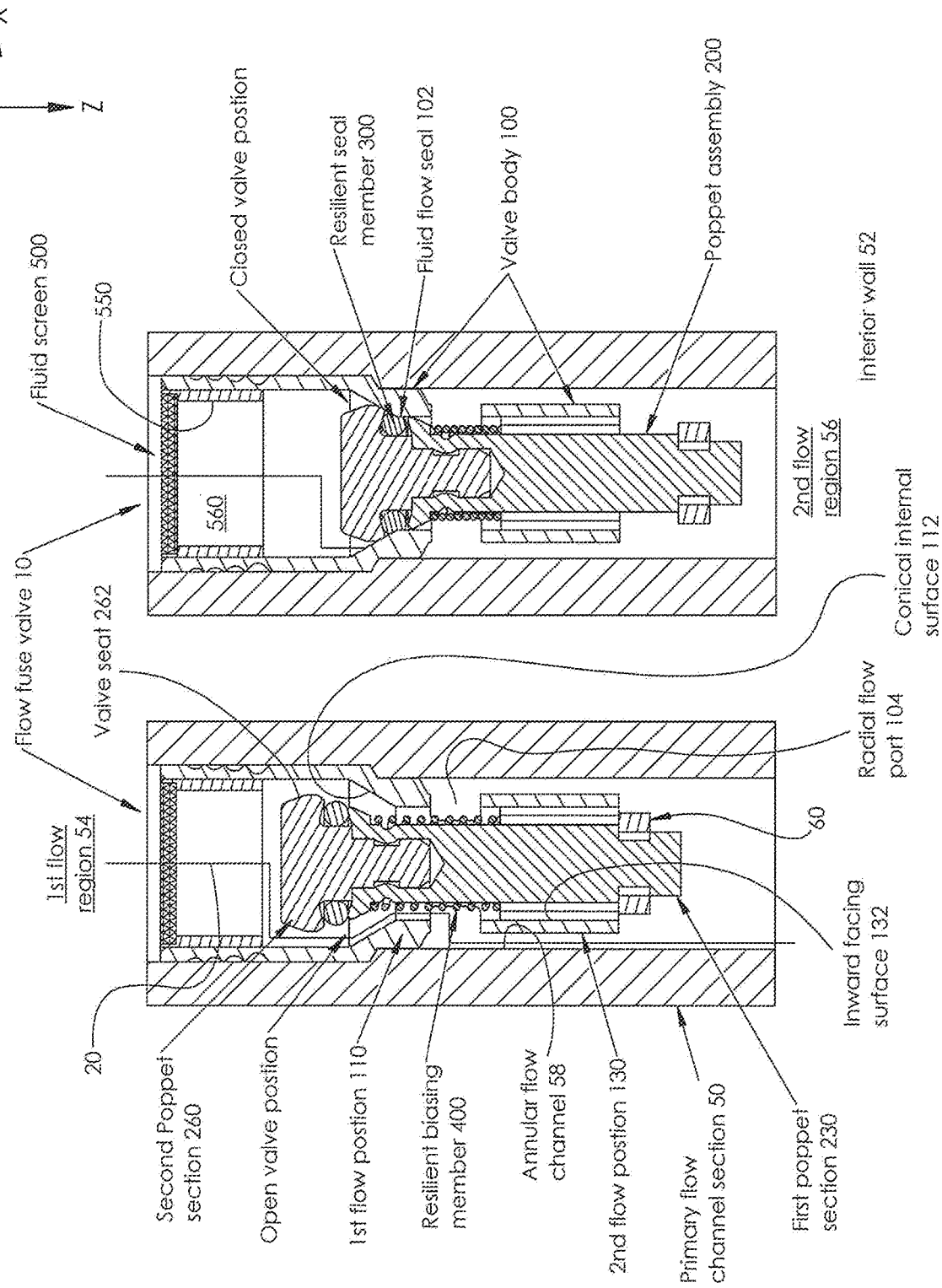

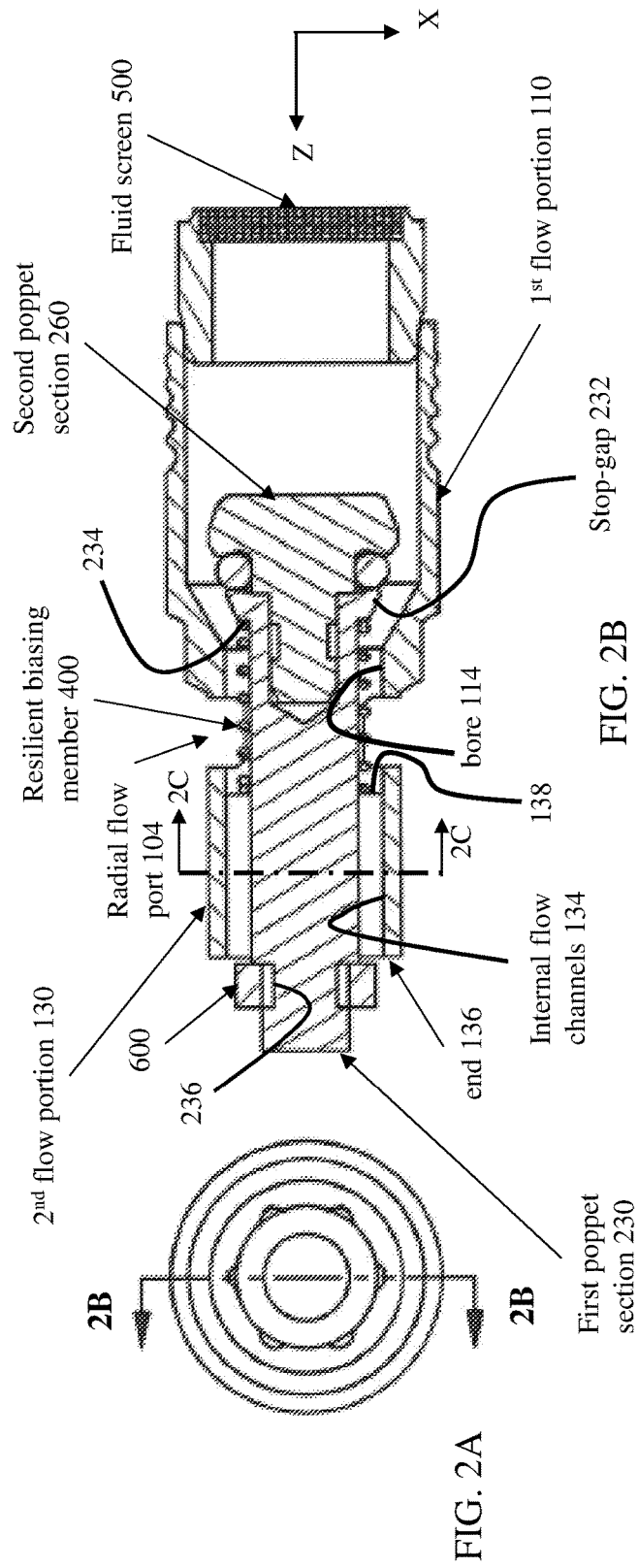
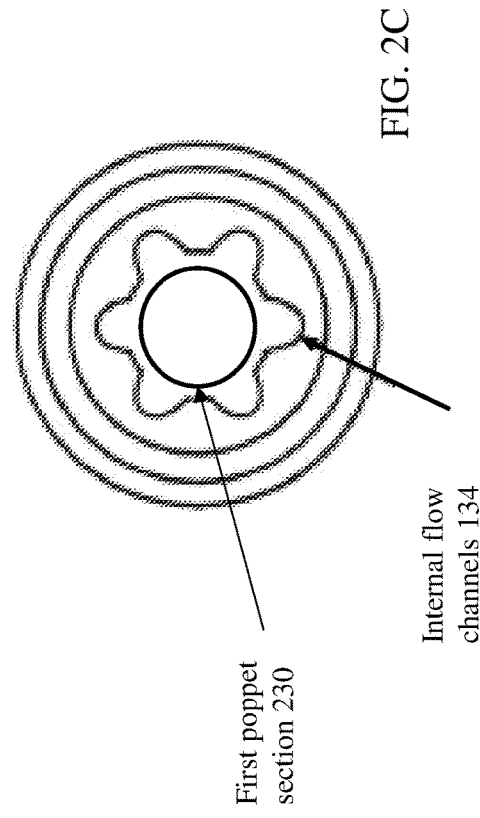
FIG. 2A
FIG. 2B
FIG. 2C

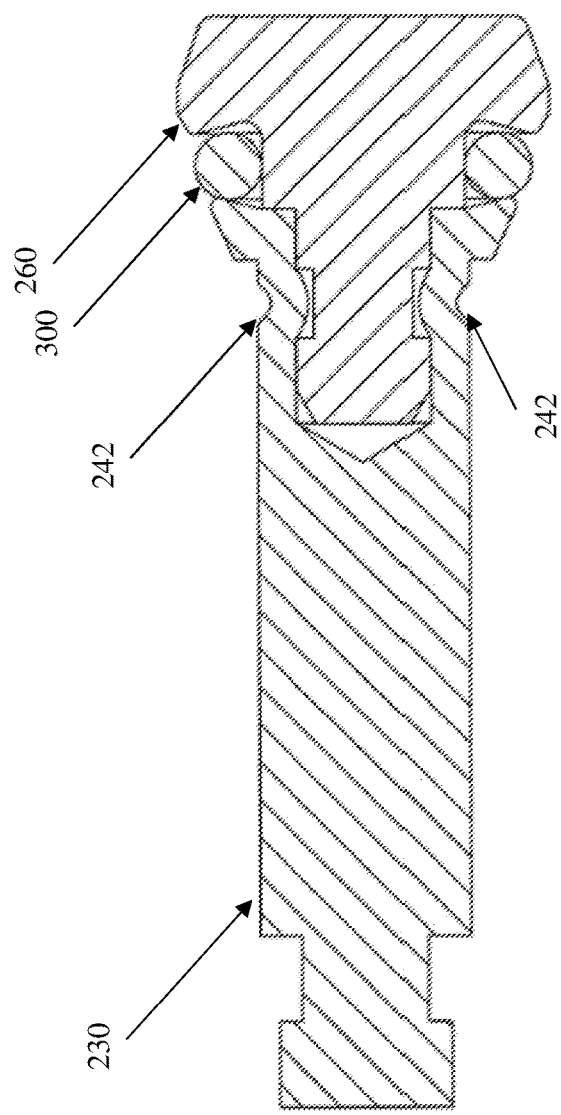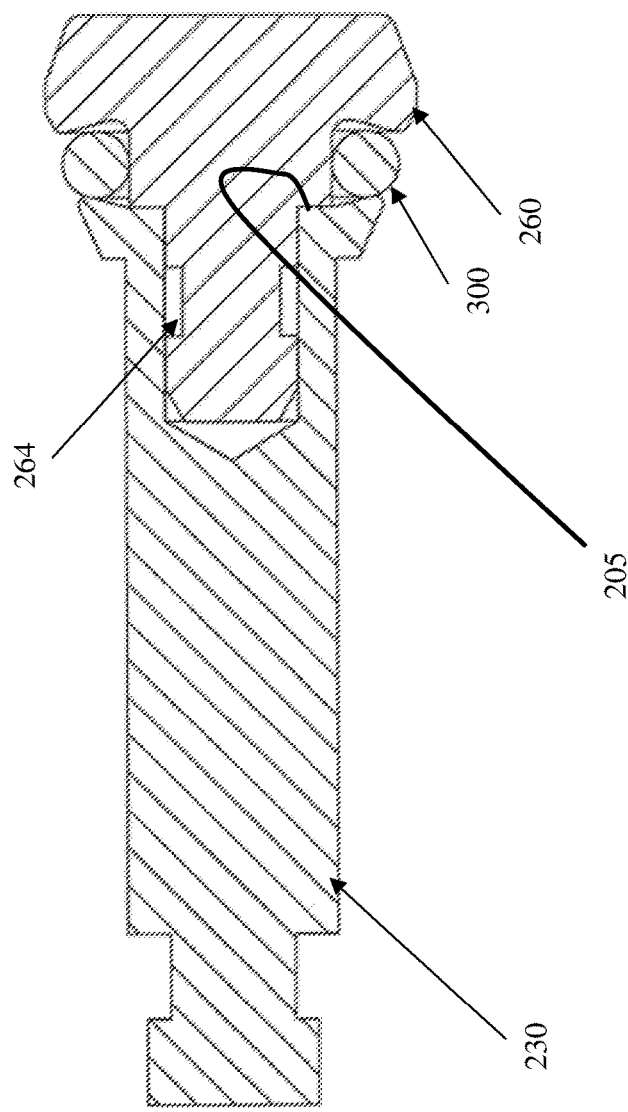
FIG. 2F
FIG. 2E

FLOW FUSE VALVE AND METHOD OF ASSEMBLY THEREOF

CROSS REFERENCE TO RELATED APPLICATIONS

This application claims the benefit of U.S. Provisional Application Ser. No. 63/137,510, filed Jan. 14, 2021, which is incorporated herein by reference in its entirety.

BACKGROUND

The present disclosure relates generally to a flow fuse valve and a method of assembly thereof.

Flow fuses are used to interrupt fluid flow in the event of a downstream rupture in an associated fluid flow line with an accompanying substantial step-wise decrease in fluid pressure therein (herein referred to as a fluid flow short circuit). While existing flow fuses may be suitable for their intended purpose, the art of flow fuses would be advanced with a flow fuse construct that prevents washing out or displacement of a sealing member during a rapid change in fluid pressure associated with a fluid flow short circuit event.

BRIEF SUMMARY

An embodiment includes a flow fuse valve configured to be installed inline within a primary flow channel section having an interior wall, a first flow region, and a second flow region, the flow fuse valve having: a valve body; a poppet assembly disposed within the valve body, the poppet assembly having: a first poppet section; a second poppet section; a resilient seal member disposed and captured between the first poppet section and the second poppet section, wherein the first and second poppet sections are securely fastened with respect to each other subsequent to the resilient seal member being captured therebetween; and a resilient biasing member disposed between the first poppet section and the valve body that is configured to bias the poppet assembly toward an open-valve position; wherein the resilient seal member and the valve body are configured to form a fluid flow seal in response to the poppet assembly being disposed in a closed-valve position via an abrupt fluid pressure drop in the primary flow channel section downstream of the flow fuse valve, wherein the fluid flow is from the first flow region toward the second flow region.

An embodiment includes a method of assembling a fluid flow valve in accordance with the foregoing, the method including: providing a first poppet section; providing a resilient seal member; providing a second poppet section; assembling and securely fastening the second poppet section with the first poppet section, with the resilient seal member being captured between the first poppet section and the second poppet section, thereby providing a poppet assembly; providing a resilient biasing member; providing a valve body; installing the resilient biasing member and the poppet assembly into the valve body with the resilient biasing member captured between the valve body and the poppet assembly, the resilient biasing member being disposed and configured to bias the poppet assembly outward of the valve body; and fixedly restraining the poppet assembly relative to the valve body in an axial direction that prevents separation therebetween, with the resilient biasing member disposed therebetween.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures:

FIGS. 1A and 1B depict central longitudinal cross section views of an example flow fuse valve in an open position and in a closed position, respectively, in situ, in accordance with an embodiment;

FIG. 2A depicts an end view, as viewed from the side of the second flow region, of the flow fuse valve of FIG. 1A, in accordance with an embodiment;

FIG. 2B depicts a central longitudinal cross section view of the flow fuse valve of FIGS. 1A and 2A cut through section 2B-2B of FIG. 2A, in accordance with an embodiment;

FIG. 2C depicts an axial cross section view through section cut 2C-2C of FIG. 2B, in accordance with an embodiment;

FIGS. 2E and 2F depict a cross section views of the poppet assembly of FIG. 2B prior to and subsequent to, respectively, the first and second poppet sections being fixated with respect to each other, in accordance with an embodiment;

Figure 1C:
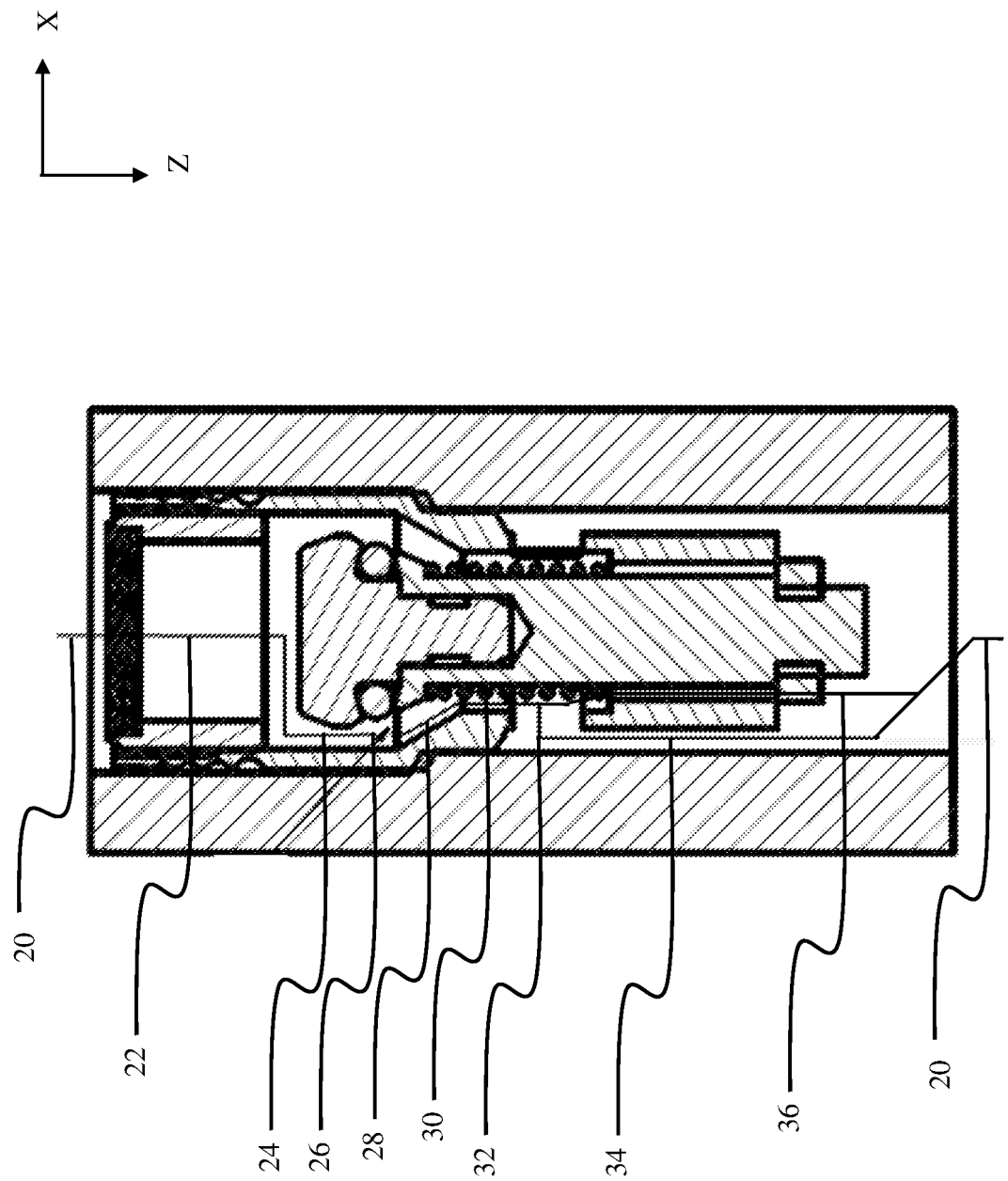
FIG. 1C depicts the central longitudinal cross section view of FIG. 1A with particular flow path detail enumerated, in accordance with an embodiment.

One skilled in the art will understand the drawings, described herein below, are for illustration purposes only. It will be appreciated that for simplicity and clarity of illustration, elements shown in the figures have not necessarily been drawn to scale. For example, the dimensions or scale of some of the elements may be exaggerated relative to other elements for clarity. Further, where considered appropriate, reference numerals may be repeated among the figures to indicate corresponding or analogous elements.

DETAILED DESCRIPTION

Although the following detailed description contains many specifics for the purposes of illustration, anyone of ordinary skill in the art will appreciate that many variations and alterations to the following details are within the scope of the appended claims. For example, where described features may not be mutually exclusive of and with respect to other described features, such combinations of non-mutually exclusive features are considered to be inherently disclosed herein. Accordingly, the following example embodiments are set forth without any loss of generality to, and without imposing limitations upon, the claimed invention disclosed herein.

An embodiment, as shown and described by the various figures and accompanying text, provides a flow fuse valve 10 having a resilient seal member 300 disposed between a first poppet section 230 and a second poppet section 260 in such a manner as to prevent washing out or displacement of the sealing member 300 during a rapid change in fluid pressure associated with a fluid flow short circuit event. While the embodiment described herein depicts an O-ring as an exemplary sealing member 300, it will be appreciated that the invention described in the appended claims may also be applicable to other sealing members of different cross-sectional shapes suitable for a purpose disclosed herein.

Reference is now made to FIGS. 1A and 1B that depict the flow fuse valve 10 in situ in open and closed positions, respectively. As depicted, the flow fuse valve 10 is configured to be installed inline within a primary flow channel section 50 having an interior wall 52, a first flow region 54, and a second flow region 56, with an embodiment having a primary flow direction being from the side of the first flow region 54 toward the side of the second flow region/side 56. However, it will be appreciated that another embodiment may be configured to have a primary flow direction being from the side of the second flow region 56 toward the side of the first flow region 54. The flow fuse valve 10 may be threaded with, press-fit into, interference fit into with subsequent pin expansion, or otherwise attached to, the primary flow channel section 50, which will be discussed further herein below. The flow fuse valve 10 has a valve body 100, and a poppet assembly 200 disposed within the valve body 100. The poppet assembly 200 includes a first poppet section 230 disposed on the side of the second flow region 56 of the valve body 100, a second poppet section 260 disposed on the side of the first flow region 54 of the valve body 100, a resilient seal member 300 disposed and captured between the first poppet section 230 and the second poppet section 260, wherein the first and second poppet sections 230, 260 are securely fastened with respect to each other subsequent to the resilient seal member 300 being captured therebetween, and a resilient biasing member 400 disposed between the first poppet section 230 and the valve body 100 that is configured to bias the poppet assembly 200 toward an open-valve position as depicted in FIG. 1A. The resilient seal member 300 and the valve body 100 are configured to form a fluid flow seal 102 in response to the poppet assembly 200 being disposed in a closed-valve position, as depicted in FIG. 1B, via an abrupt fluid pressure drop in the primary flow channel section 50 downstream of the flow fuse valve 10 arising from a fluid flow short circuit event. The valve body 100 has a first flow portion 110 on the side of the first flow region 54, and a second flow portion 130 on the side of the second flow region 56, with at least one radial flow port 104 disposed therebetween (two opposing flow ports 104 depicted in the cross-section illustrations of FIGS. 1A and 1B, and one of the two opposing flow ports 104 depicted in FIG. 3B). In an embodiment, the first poppet section 230 is axially restrained 60 in the open-valve position (FIG. 1A) via the second flow portion 130 of the valve body 100, which in an embodiment is accomplished via a pliable retainer ring 600 securely disposed in a circumferential groove 236 of the first poppet section 230 that engages with an end 136 of the second flow portion 130 of the valve body 100 (best seen with reference to FIG. 2B). While FIGS. 1A, 1B and 3B, depict and suggest two radial flow ports 104, it will be appreciated that any number of flow ports for a purpose disclosed herein may be incorporated into the valve body 100. In an embodiment, the at least one radial flow port 104 consists of two radial flow ports 104. In an embodiment where the fluid flow is from the side of the first flow region 54 toward the side of the second flow region, a fluid screen 500 may be disposed upstream from the second poppet section 260 to screen out particulates that may inadvertently interfere with the operation of the valve sealing and shut-off function. In another embodiment where the fluid flow is from the side of the second flow region 56 toward the side of the first flow region 54, a fluid screen 500 may be disposed upstream from the first poppet section 230 to screen out particulates that may inadvertently interfere with the operation of the valve sealing and shut-off function. In an embodiment where the fluid flow is from the side of the first flow region 54 toward the side of the second flow region 56, the fluid screen 500 may be incorporated into a pin or screen insert 550 that may be expansion fit into or otherwise secured to (press fit or interference fit, for example) the first flow portion 110 of the valve body 100. In an embodiment where the fluid flow is from the side of the second flow region 56 toward the side of the first flow region 54, the fluid screen 500 may be incorporated into a pin or screen insert 550 that may be expansion fit into or otherwise secured to (press fit or interference fit, for example) the second flow portion 130 of the valve body 100. In an embodiment, the flow fuse valve 10 may be threadably engaged with or otherwise secured to (press fit, or interference fit into with subsequent pin expansion, for example) the primary flow channel section 50.

As depicted in FIG. 1B, the fluid flow seal 102 is formed between the resilient seal member 300 and the valve body 100, and is disposed within the first flow portion 110 of the valve body 100. In an embodiment, the resilient seal member 300 is an elastomeric O-ring. In an embodiment, the fluid flow seal 102 is formed between the resilient seal member 300 and a conical internal surface 112 of the first flow portion 110 of the valve body 100.

As depicted, and best seen with reference to FIG. 2B, the resilient biasing member 400 is disposed between an undercut surface 234 of the first poppet section 230 and a shelf 138 of the second flow portion 130 of the valve body 100. In an embodiment, the resilient biasing member 400 is a compression spring. In an embodiment, the resilient biasing member 400 traverses the at least one radial flow port 104.

In an embodiment, the second poppet section 260 has an integrally formed circumferential rigid valve seat 262 (see FIG. 1A) having an outer diameter that is larger than an outer diameter of the resilient seal member 300, such that in the closed-valve position (FIG. 1B) the valve seat 262 engages with the conical internal surface 112 of the first flow portion 110 of the valve body 100 to control a degree of compression of the resilient seal member 300.

To provide for a self-centering poppet assembly 200 during a valve closing operation, the second flow portion 130 of the valve body 100 provides an axial guide for the poppet assembly 200 between the open-valve position (FIG. 1A) and the closed-valve position (FIG. 1B) with an elongated space (see internal flow channels 134, FIGS. 2B and 2C) therebetween that is sufficiently sized for the self-centering operation of the poppet assembly 200. Stated alternatively, the poppet assembly 200 is substantially but not fully radially restrained by the valve body 100, thereby permitting the poppet assembly 200 and the fluid flow seal 102 to self-center between an open-valve position (FIG. 1A) and a closed-valve position (FIG. 1B). In an embodiment, the elongated space between the second flow portion 130 and the poppet assembly 200 is provided by an inwardly facing surface 132 of the second flow portion 130 of the valve body 100 that includes the plurality of internal flow channels 134 (see also FIGS. 2B and 2C) adjacent the first poppet section 230 of the poppet assembly 200. As depicted in FIG. 2B, the plurality of internal flow channels 134 extend from the at least one radial flow port 104 to the end 136 of the second flow portion 130 of the valve body 100. As also depicted in FIG. 2B, the plurality of internal flow channels 134 are substantially void of the resilient biasing member 400, with the second flow region end of the resilient biasing member 400 being disposed on the shelf 138 formed in the second flow portion 130 of the valve body 100 proximate the radial flow ports 104. In an embodiment, the plurality of internal flow channels 134 are axially aligned with each other (see FIGS. 2B and 2C for example). In an embodiment, the plurality of internal flow channels 134 are linear flow channels axially aligned with a central axis of the primary flow channel section 50. In an embodiment, the plurality of internal flow channels 134 have an axial cross-section profile with a hexalobular configuration of linear grooves, which in an embodiment is in accordance with the ISO 10664 standard. While a particular cross sectional profile of the plurality of internal flow channels 134 is depicted herein, hexalobular for example, it will be appreciated that other cross sectional profiles suitable for a purpose disclosed herein may be employed without detracting from a scope of an invention disclosed herein. Other example cross sectional profiles alternative to the hexalobular profile illustrated herein include but are not limited to: hexagon (true hexagon absent lobes), octagon, octa-lobular, square, square-lobular, pentagon, penta-lobular, triangle, tri-lobular, multi-spline, multi-lobular. As will be appreciated, the hexalobular cross sectional profile disclosed herein is but only one configuration that may be suitable for the internal flow channels 134. As such, any and all cross sectional profiles for the plurality of internal flow channels 134 are contemplated, considered to be inherently disclosed herein, and therefore considered to fall within an ambit of the appended claims.

Figure 2D:
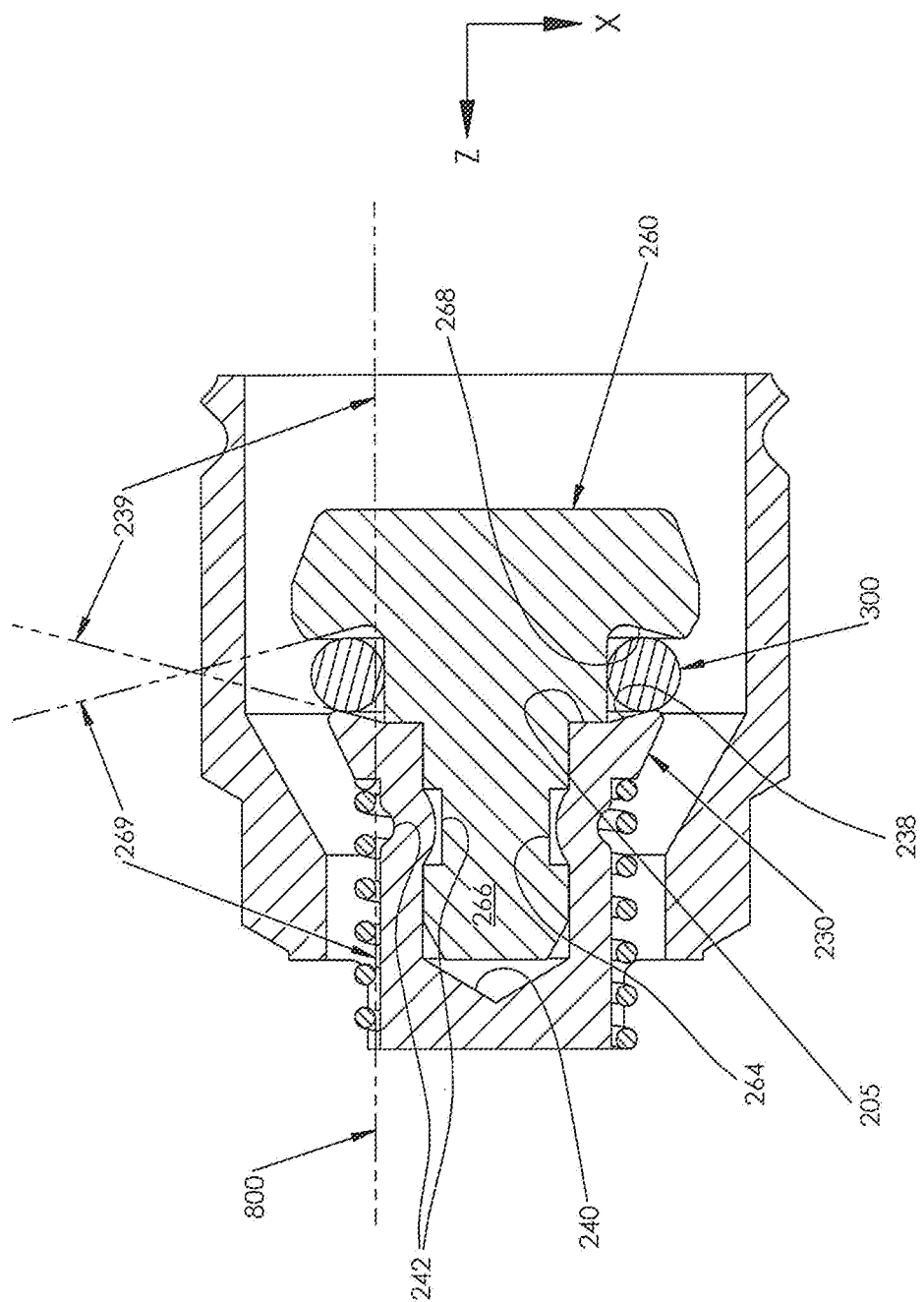
FIG. 2D depicts an enlarged view of a portion of the cross section view of FIG. 2B, in accordance with an embodiment.

Reference is now made to FIG. 2D that depicts an enlarged view of the resilient seal member 300 disposed between the first poppet section 230 and the second poppet section 260. In an embodiment, the first poppet section 230 has a first circumferential retaining surface 238 proximate the resilient seal member 300 and disposed at a first angle 239 relative to a datum 800 defined by an outer circumferential surface of the second poppet section 260, and the second poppet section 260 has a second circumferential retaining surface 268 proximate the resilient seal member 300 and disposed at a second angle 269 relative to the datum 800. In an embodiment, at least one of the first and second angle 239, 269 is an acute angle equal to or greater than 55-degrees and equal to or less than 80-degrees. In an embodiment, at least one of the first and second angle 239, 269 is an acute angle equal to or greater than 60-degrees and equal to or less than 75-degrees. In an embodiment, each of the first and second angle 239, 269 is an acute angle having an angular range as disclosed herein. As will be appreciated, each surface 238, 268 provides a half-dovetail groove or containment surface that serves to capture the resilient seal member 300 from being washed out or displaced during a valve closing event.

As can be seen with reference to FIGS. 2D, 2E and 2F, collectively, the two-part poppet assembly 200 of the first poppet section 230 and the second poppet section 260 consists of the first poppet section 230 being mechanically fixated with respect to the second poppet section 260. In an embodiment, the first poppet section 230 has a bored out pocket 240, which in an embodiment is a blind pocket, and the second poppet section 260 has a projection 266 disposed within the pocket 240. With the resilient seal member 300 positioned proximate the second circumferential retaining surface 268, the projection 266 of the second poppet section 260 is slidably inserted into the pocket 240 of the first poppet section 230 until stop surfaces at 205 on the first and second poppet sections 230, 260 engage each other, at which time the first and second poppet sections 230, 260 can be mechanically fixated with respect to each other in a manner disclosed herein to form the poppet assembly 200. In an embodiment, the projection 266 has a circumferential groove 264, and the mechanical fixation of the first poppet section 230 with respect to the second poppet section 260 is accomplished by swedging a portion of the first poppet section 230 into the circumferential groove 264 of the second poppet section 260, depicted by swedged region 242 in FIGS. 2D and 2F.

Figure 3A:
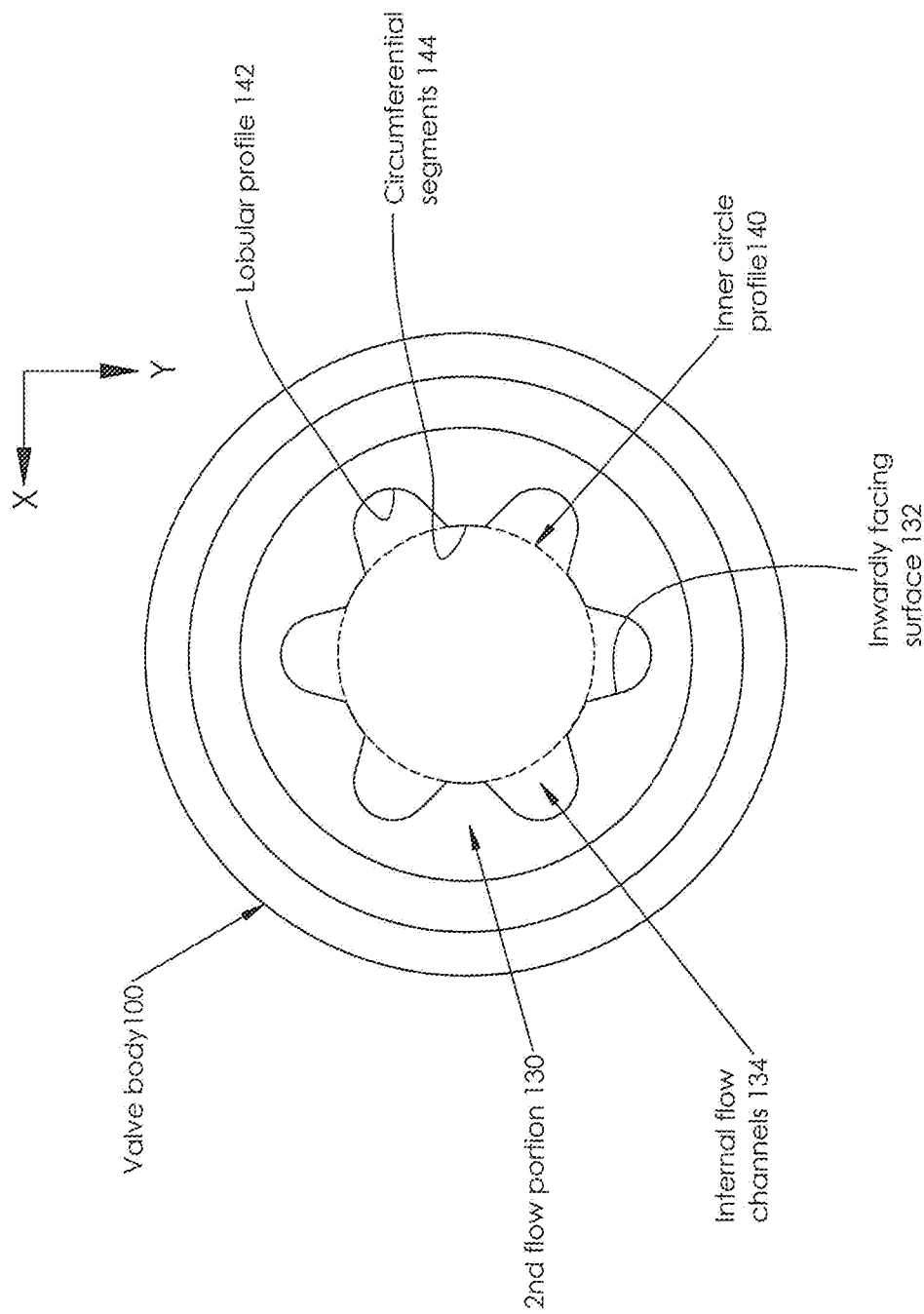
FIG. 3A depicts an end view, as viewed from the side of the second flow region, of the valve body of the flow fuse valve of FIG. 2B, in accordance with an embodiment.
Figure 3B:
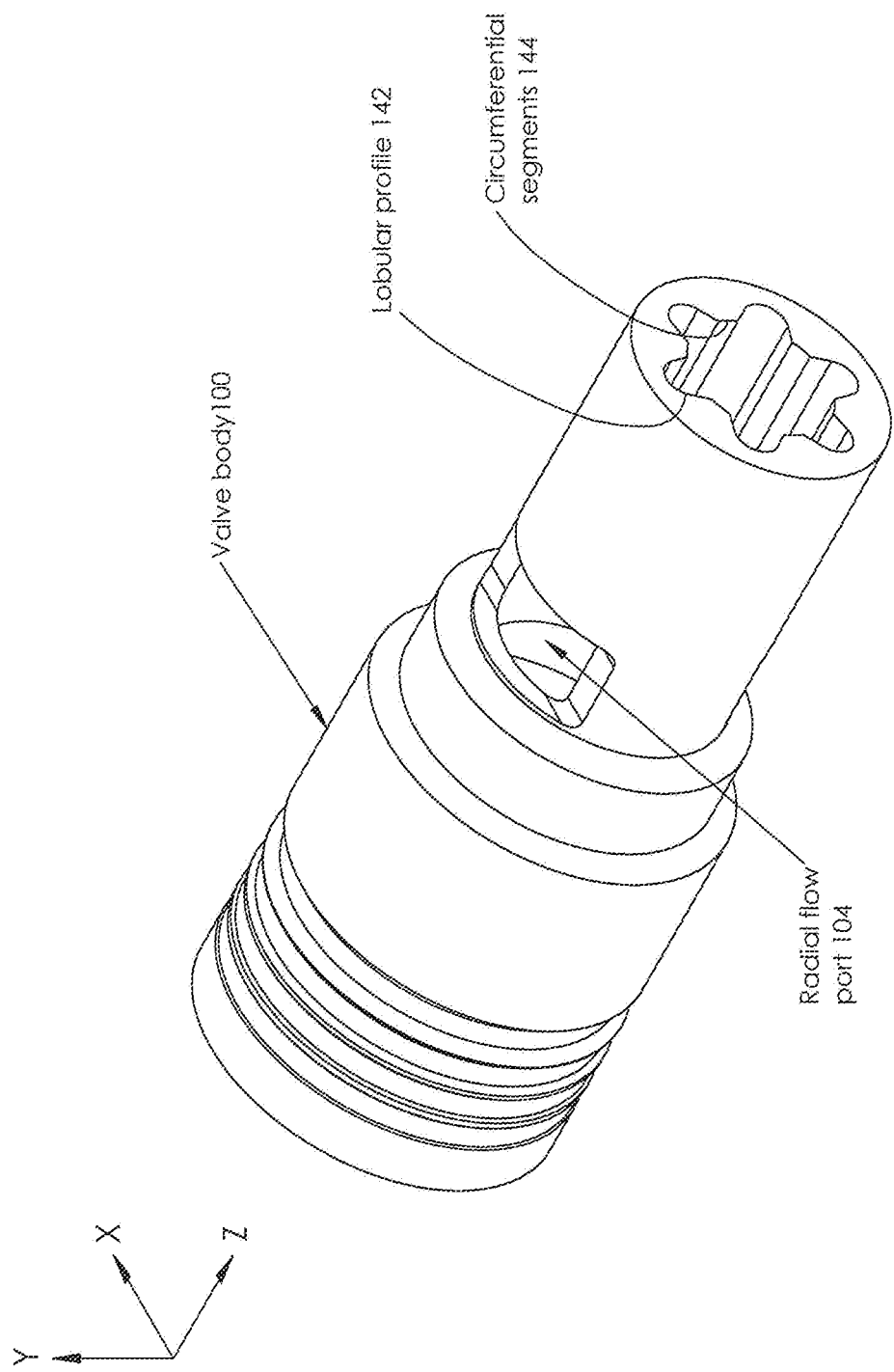
FIG. 3B depicts a rotated isometric view of the valve body of FIG. 3A, in accordance with an embodiment.

With reference now to FIG. 3A that depicts an axial cross section profile of the second flow portion 130 of the valve body 100, the inwardly facing surface 132 of the second flow portion 130 of the valve body 100 has, in combination, partially an inner circular profile 140 and partially a plurality of integrally formed lobular profiles 142 that extend radially outward of the partial inner circular profile 140, the combination of the partial inner circular profile 140 and the plurality of integrally formed lobular profiles 142 forming the plurality of internal flow channels 134, where the first poppet section 230 has an outside diameter that is less than an inside diameter of the inner circular profile 140 (best seen with reference to FIG. 2C in combination with FIG. 3A). As can be seen with reference to FIG. 3A, the inwardly facing surface 132 of the second flow portion 130 of the valve body 100 proximate the plurality of flow channels 134 includes the integrally formed lobular profiles 142 that are spaced apart from each other by circumferential segments 144 of the inner circular profile 140. In an embodiment, the lobular profiles 142 are in the form of a hexalobular configuration, as observed and depicted in the axial cross section view of FIG. 3A.

Reference is now made back to FIG. 1A, in combination with FIG. 1C, the second flow portion 130 of the valve body 100 is configured to provide an annular flow channel 58 between an outer surface of the second flow portion 130 and the interior wall 52 of the primary flow channel section 50. In the open-valve position depicted in FIGS. 1A and 1C, a fluid flow path 20 across the flow fuse valve 10 traverses: an axial path 22 within the first flow portion 110 of the valve body 100; then, an annular path 24 between the second poppet section 260 and the first flow portion 110 of the valve body 100; then, an annular path 26 between the resilient seal member 300 and the first flow portion 110 of the valve body 100; then, an annular path 28 between the first poppet section 230 and the conical internal surface 112; then, an annular path 30 between the first poppet section 230 and the first flow portion 110 of the valve body 100; then, a radial flow path 32 through the at least one radial flow port 104; and then, a first downstream flow path 34 that is an annular flow path between the second flow portion 130 of the valve body 100 and the interior wall 52 of the primary flow channel section 50. As further depicted in the open-valve position in FIG. 1C, the fluid flow path 20 across the flow fuse valve 10 further traverses a second downstream flow path 36 via the plurality of internal flow channels 134 (see also FIG. 2B) between the second flow portion 130 of the valve body 100 and the first poppet section 230 (see also FIG. 1A). In an embodiment, the second downstream flow path 36 is fluidly connected in parallel with the first downstream flow path 34.

Reference is now made particularly to FIG. 2B. In an embodiment, the first flow portion 110 of the valve body 100 has a bore 114 with an inside diameter ID-1, the first poppet section 230 has a circumferential stop-gap 232 having an overall outside diameter OD-1, where OD-1 is sized to restrictively fit within ID-1 such that the stop-gap 232 of the first poppet section 230 substantially restricts fluid flow through the bore 114 of the first flow portion 110 of the valve body 100 when the flow fuse valve 10 is in a closed-valve position (FIG. 1B).

Figure 1D:
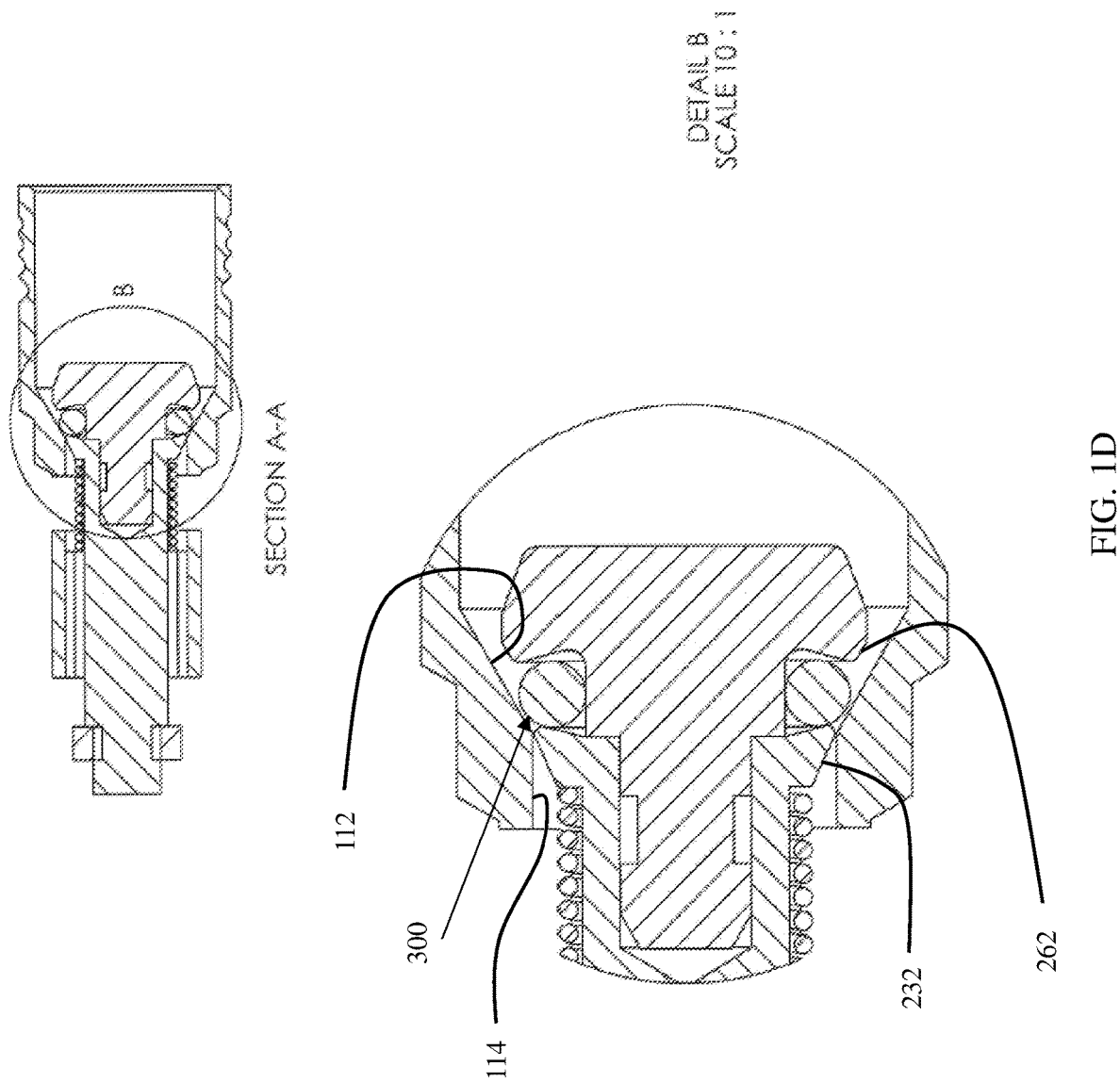
FIG. 1D depicts a cross section view of the flow fuse valve depicted in FIGS. 1A-1C, with associated Detail-B, but with the poppet assembly in a partially closed position, in accordance with an embodiment.

From the foregoing it will be appreciated that in response to the flow fuse valve 10 transitioning from an open-valve position depicted in FIG. 1A to a closed-valve position depicted in FIG. 1B, with a partially closed position depicted in FIG. 1D, the flow fuse valve 10 is so configured such that: as the valve seat 262 of the poppet assembly 200 travels toward the conical internal surface 112 of the valve body 100, the circumferential stop-gap 232 of the first poppet section 230 enters into the bore 114 of the first flow portion of the valve body 100 to restrict fluid flow through the bore 114, followed by the resilient seal member 300 engaging with the conical internal surface 112 to establish a seal to fluid flow through the bore 114, followed by the valve seat 262 engaging with the conical internal surface 112 to control compression of the resilient seal member 300. While not being held to any particular theory, it has been found that such a restrictive fit between the stop-gap 232 and the bore 114 during an open-to-close action of the flow fuse valve 10 is effective in reducing the velocity of fluid flow at the point of valve closure to assist in preventing the washing out or displacement of the resilient seal member 300. Additionally while not being held to any particular theory, it has been found that the combination of the radial flow ports 104 and the internal flow channels 134, with the internal flow channels 134 being substantially void of the resilient biasing member 400, provides for enhanced closing and sealing action of the flow fuse valve 10 in response to a fluid flow short circuit event.

Figure 2G:
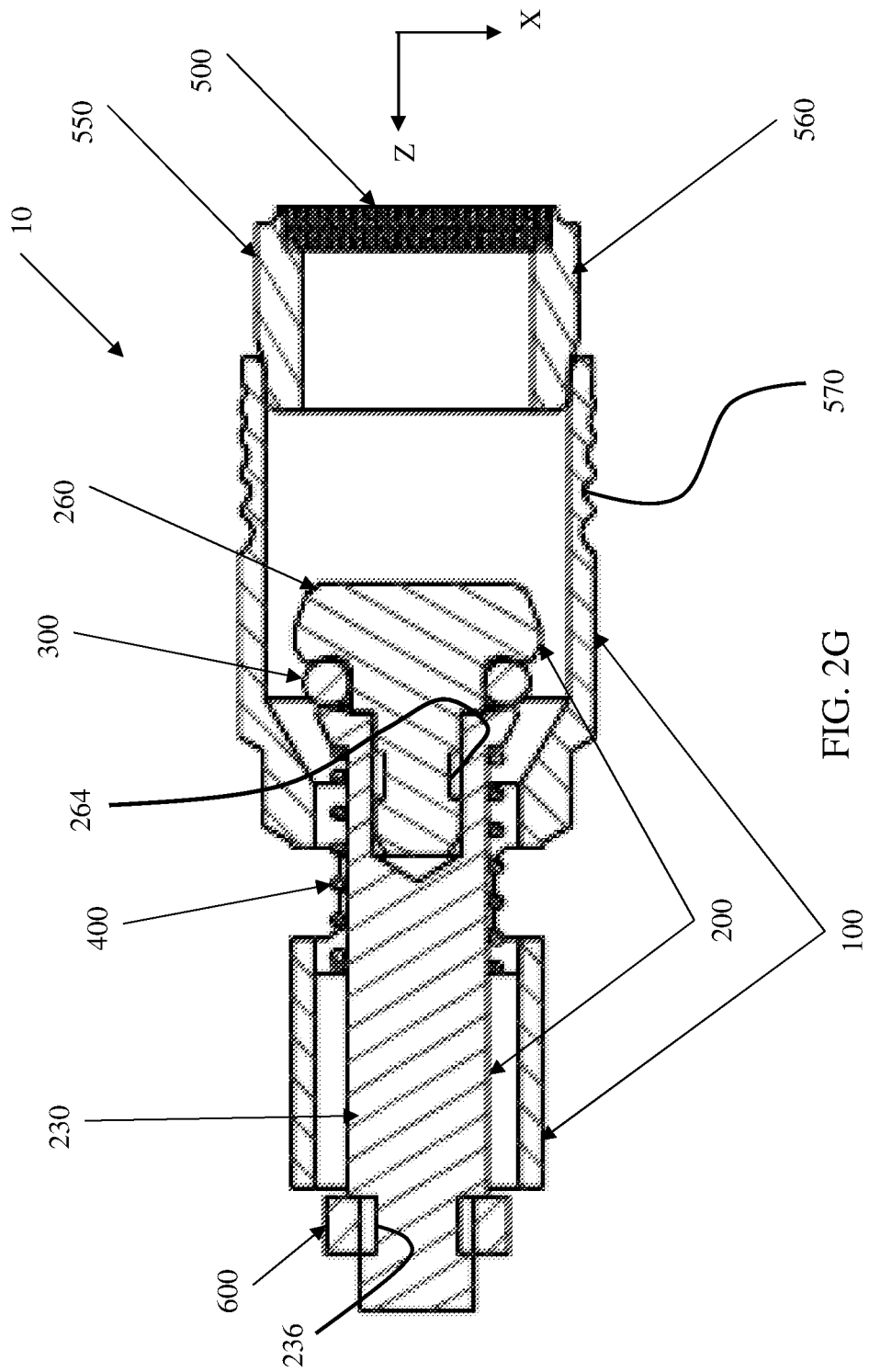
FIG. 2G depicts the cross section view of FIG. 2B with particular detail enumerated, in accordance with an embodiment.
Figure 4:
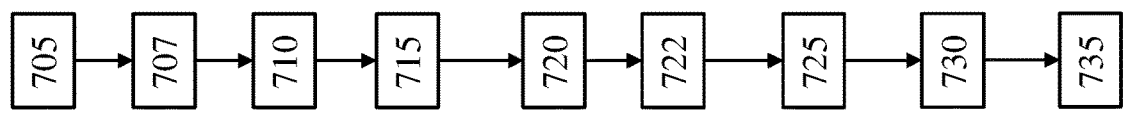
FIG. 4 depicts a flow chart of a method of assembly, in accordance with an embodiment.

In view of the foregoing description and accompanying illustration of structure of the flow fuse valve 10, and with reference particularly to FIG. 2G and FIG. 4, it will be appreciated that a method 700 of assembling the fluid flow valve 10 includes: providing 705 a first poppet section 230; providing 707 a resilient seal member 300; providing 710 a second poppet section 260; assembling 715 and securely fastening 720 the second poppet section 260 with the first poppet section 230, with the resilient seam member 300 being captured between the first poppet section 230 and the second poppet section 260, thereby providing a poppet assembly 200; providing 722 a resilient biasing member 400; providing 725 a valve body 100; installing 730 the resilient biasing member 400 and the poppet assembly 200 into the valve body 100 with the resilient biasing member 400 captured between the valve body 100 and the poppet assembly 200, the resilient biasing member 400 being disposed and configured to bias the poppet assembly 200 outward of the valve body 100; and, fixedly restraining 735 the poppet assembly 200 relative to the valve body 100 in an axial direction that prevents separation therebetween, with the resilient biasing member 400 disposed therebetween.

In an embodiment, the step of assembling 715 and securely fastening 720 the second poppet section 260 with the first poppet section 230 involves slidably inserting the projection 266 of the second poppet section 260 into the pocket 240 of the first poppet section 230, and swedging a portion of the first poppet section 230 into the circumferential groove 264 of the second poppet section 260, thereby mechanically fixating the first poppet section 230 with respect to the second poppet section 260.

In an embodiment, the fixed restraint of the poppet assembly 200 relative to the valve body 100 in an axial direction, only one axial direction, is accomplished by installing a pliable retainer ring 600 in a groove 236 of the first poppet section 230 such that the retainer ring 600 engages with an end 136 of the second flow portion 130 of the valve body 100 under the influence of the resilient biasing member 400 biasing the poppet assembly 200 outward of the valve body 100.

In an embodiment where fluid flow is from the first flow region 54 toward the second flow region 56, the method 700 further includes assembling a fluid screen 500 with respect to the valve body 100 upstream from the second poppet section 260 to screen out particulates that may inadvertently interfere with the operation of the valve sealing and shut-off function. As described herein above, the fluid screen 500 may be incorporated into a pin or screen insert 550.

Reference is now made to FIGS. 1A, 1B and FIG. 2G, where FIGS. 1A, 1B depict a screen 500 and pin 550 assembly 560 fully inserted into the valve body 100, and FIG. 2G depicts the screen 500 and pin 550 assembly 560 only partially inserted into the valve body 100. To fully insert the pin/screen assembly 560 into the valve body 100 the insert principle is employed, which is described in the Lee Co. IMH Handbook available online at www.leeimh.com. In summary, the insert principle uses a pin, such as pin 550, to expand a grooved section 570 (best seen with reference to FIG. 2G) of an insert, such as the valve body 100, or more particularly the first flow portion 110 of the valve body 100, into a housing wall, such as the housing wall of the primary flow section 50, where the expansion fit serves to secure the valve body 100, and therefore the flow fuse valve 10, in the primary flow section 50. An insert tool (not shown but described in the aforementioned Lee Co. IMH Handbook) may be used to properly seat the pin/screen assembly 560 into the valve body 100. While an embodiment is depicted herein having a pin/screen assembly 560 having both a screen 500 and a pin 550, it will be appreciated that the screen 500 may be omitted leaving just the pin 550 to be used in an expansion fit matter to secure the flow fuse valve 10 in the primary flow section 50.

By providing a two-part poppet assembly 200 having the resilient seal member 300 disposed and captured between the first poppet section 230 and the second poppet section 260 as disclosed herein provides for installation of the resilient seal member 300 within the flow fuse valve 10 without the need to stretch or over-stretch the resilient seal member 300 over an outer diameter of the first or second poppet sections 230, 260 that are greater than an inner diameter of the resilient seal member 300, which in an embodiment is an O-ring, as an over-stretched O-ring may be more susceptible to washing out or displacement from an increased velocity of fluid flow during a valve closing event. Additionally, the providing of a two-part poppet assembly 200 has the advantage of more cost-efficiently being able to manufacture the half-dovetail surfaces 238, 268 as described above and illustrated herein. Yet another advantage of providing the two-part poppet assembly 200 in the flow fuse valve 10 as disclosed herein is to provide a design that minimizes component manufacturing costs while also providing for automated assembly, and more particularly one-direction (sometimes referred to as top-down) assembly.

While not being held to any particular theory, it was found that inclusion of the internal flow channels 134 in the design of the flow fuse valve 10 significantly increased the flow rate achievable, which was a significant challenge for achieving the desired operational performance of the flow fuse valve 10, where in its normal open state the flow fuse valve 10 desirably allows for an unobstructed fluid flow.

While an invention has been described herein with reference to example embodiments, it will be understood by those skilled in the art that various changes may be made and equivalents may be substituted for elements thereof without departing from the scope of the claims. Many modifications may be made to adapt a particular situation or material to the teachings of the invention without departing from the essential scope thereof. Therefore, it is intended that the invention not be limited to the particular embodiment or embodiments disclosed herein as the best or only mode contemplated for carrying out this invention, but that the invention will include all embodiments falling within the scope of the appended claims. In the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item. The term "comprising" as used herein does not exclude the possible inclusion of one or more additional features. And, any background information provided herein is provided to reveal information believed by the applicant to be of possible relevance to the invention disclosed herein. No admission is necessarily intended, nor should be construed, that any of such background information constitutes prior art against an embodiment of the invention disclosed herein.

The invention claimed is:

1. A flow fuse valve configured to be installed inline within a primary flow channel section having an interior wall, a first flow region, and a second flow region, the flow fuse valve comprising:
   a valve body;
   a multi-part poppet assembly disposed within the valve body, the multi-part poppet assembly comprising:
   a first poppet section;
   a second poppet section separate and distinct from the first poppet section;
   a resilient seal member disposed and captured between the first poppet section and the second poppet section, wherein the first and second poppet sections are securely fastened with respect to each other subsequent to the resilient seal member being captured therebetween; and
   a resilient biasing member disposed between the first poppet section and the valve body that is configured to bias the poppet assembly toward an open-valve position;
   wherein the resilient seal member and the valve body are configured to form a fluid flow seal in response to the poppet assembly being disposed in a closed-valve position via an abrupt fluid pressure drop in the primary flow channel section downstream of the flow fuse valve, wherein fluid flow is from the first flow region toward the second flow region.

2. The flow fuse valve of claim 1, wherein:
the valve body comprises a first flow portion and a second flow portion with at least one radial flow port disposed therebetween.

3. The flow fuse valve of claim 2, wherein:
the at least one radial flow port comprises two radial flow ports.

4. The flow fuse valve of claim 2, wherein:
the fluid flow seal is disposed within the first flow portion of the valve body.

5. The flow fuse valve of claim 2, wherein:
the resilient biasing member is disposed between the first poppet section and the second flow portion of the valve body.

6. The flow fuse valve of claim 2, wherein:
the fluid flow seal is formed between the resilient seal member and a conical internal surface of the first flow portion of the valve body.

7. The flow fuse valve of claim 6, wherein:
the second poppet section comprises a valve seat having an outer diameter that is larger than an outer diameter of the resilient seal member, such that in the closed-valve position the valve seat engages with the conical internal surface of the first flow portion of the valve body to control a degree of compression of the resilient seal member.

8. The flow fuse valve of claim 2, wherein:
the second flow portion of the valve body provides an axial guide for the poppet assembly between the open-valve position and the closed-valve position.

9. The flow fuse valve of claim 2, wherein:
the resilient biasing member traverses the at least one radial flow port.

10. The flow fuse valve of claim 2, wherein:
an inwardly facing surface of the second flow portion of the valve body comprises a plurality of internal flow channels adjacent the first poppet section.

11. The flow fuse valve of claim 10, wherein:
the plurality of internal flow channels are axially aligned with each other.

12. The flow fuse valve of claim 10, wherein:
the plurality of internal flow channels are substantially void of the resilient biasing member.

13. The flow fuse valve of claim 10, wherein:
the plurality of internal flow channels are linear flow channels axially aligned with the primary flow channel section.

14. The flow fuse valve of claim 10, wherein:
the plurality of internal flow channels comprise a hexalobular configuration of linear grooves.

15. The flow fuse valve of claim 14, wherein:
the hexalobular configuration has an axial cross section profile according to ISO 10664 standard.

16. The flow fuse valve of claim 10, wherein:
as observed in an axial cross-section profile, the inwardly facing surface of the second flow portion of the valve body comprises, in combination, partially an inner circular profile and partially a plurality of integrally formed lobular profiles that extend radially outward of the inner circular profile, the combination of the partial inner circular profile and the plurality of integrally formed lobular profiles forming the plurality of internal flow channels.

17. The flow fuse valve of claim 16, wherein:
as observed in the axial cross-section profile, the inwardly facing surface of the second flow portion of the valve body proximate the plurality of flow channels comprises the integrally formed lobular profiles spaced apart from each other by circumferential segments of the inner circular profile.

18. The flow fuse valve of claim 16, wherein:
the lobular profiles comprise a hexalobular configuration as observed in an axial cross section of the flow fuse valve.

19. The flow fuse valve of claim 10, wherein:
the plurality of internal flow channels extend from the at least one radial flow port to an end of the second flow portion of the valve body.

20. The flow fuse valve of claim 2, wherein:
the second flow portion of the valve body is configured to provide an annular flow channel between an outer surface of the second flow portion and the interior wall of the primary flow channel section.

21. The flow fuse valve of claim 6, wherein:
in the open-valve position, a fluid flow path across the flow fuse valve traverses: an axial path within the first flow portion of the valve body; then, an annular path between the second poppet section and the first flow portion of the valve body; then, an annular path between the resilient seal member and the first flow portion of the valve body; then an annular path between the first poppet section and the conical internal surface; then, an annular path between the first poppet section and the first flow portion of the valve body; then, a radial flow path through the at least one radial flow port; and then, a first downstream flow path that is an annular flow path between the second flow portion of the valve body and the interior wall of the primary flow channel section.

22. The flow fuse valve of claim 21, wherein:
in the open-valve position, the fluid flow path across the flow fuse valve further traverses a second downstream flow path via a plurality of internal flow channels between the second flow portion of the valve body and the first poppet section.

23. The flow fuse valve of claim 22, wherein:
the second downstream flow path is fluidly connected in parallel with the first downstream flow path.

24. The flow fuse valve of claim 2, wherein:
the first poppet section is axially restrained in an open-valve position via the second flow portion of the valve body.

25. The flow fuse valve of claim 1, wherein:
the poppet assembly is substantially but not fully radially restrained by the valve body, thereby permitting the poppet assembly and the fluid flow seal to self-center between an open-valve position and a closed-valve position.

26. The flow fuse valve of claim 2, wherein:
the first flow portion of the valve body has a bore having an inside diameter ID-1, the first poppet section comprises a circumferential stop-gap having an overall outside diameter OD-1, and OD-1 is sized to restrictively fit within ID-1 such that the stop-gap of the first poppet section structurally interferes with fluid flow through the bore of the first flow portion of the valve body when the flow fuse valve is in a closed-valve position.

27. The flow fuse valve of claim 26, wherein in response to the flow fuse valve transitioning from an open-valve position to a closed-valve position, the flow fuse valve is so configured such that:
as a valve seat of the poppet assembly travels toward a conical internal surface of the valve body, the circumferential stop-gap of the first poppet section engages with and enters into the bore of the first flow portion of the valve body to restrict fluid flow through the bore, followed by the resilient seal member engaging with the conical internal surface to establish a seal to fluid flow through the bore, followed by the valve seat engaging with the conical internal surface to control compression of the resilient seal member.

28. The flow fuse valve of claim 1, further comprising:
a fluid screen disposed upstream from the second poppet section where a fluid flow is from the first flow region toward the second flow region.

29. The flow fuse valve of claim 1, wherein:
the first poppet section comprises a first retaining surface proximate the resilient seal member and disposed at a first angle relative to a datum defined by an outer circumferential surface of the second poppet section; and
the second poppet section comprises a second retaining surface proximate the resilient seal member and disposed at a second angle relative to the datum.

30. The flow fuse valve of claim 29, wherein:
at least one of the first and second angle is an acute angle equal to or greater than 55-degrees and equal to or less than 80-degrees.

31. The flow fuse valve of claim 30, wherein:
at least one of the first and second angle is an acute angle equal to or greater than 60-degrees and equal to or less than 75-degrees.

32. The flow fuse valve of claim 29, wherein:
each one of the first and second angle is an acute angle.

33. The flow fuse valve of claim 29, wherein:
at least one surface provides a half-dovetail groove or containment surface that serves to capture the resilient seal member.

34. A method of assembling a fluid flow valve, the fluid flow valve being in accordance with claim 1, the method comprising:
providing a first poppet section;
providing a resilient seal member;
providing a second poppet section;
assembling and securely fastening the second poppet section with the first poppet section, with the resilient seal member being captured between the first poppet section and the second poppet section, thereby providing a poppet assembly;
providing a resilient biasing member;
providing a valve body;
installing the resilient biasing member and the poppet assembly into the valve body with the resilient biasing member captured between the valve body and the poppet assembly, the resilient biasing member being disposed and configured to bias the poppet assembly outward of the valve body; and
fixedly restraining the poppet assembly relative to the valve body in an axial direction that prevents separation therebetween, with the resilient biasing member disposed therebetween.

35. The method of claim 34, wherein:
the securely fastening comprises mechanically fixating the first poppet section with respect to the second poppet section.

36. The method of claim 35, wherein:
the mechanically fixating comprises swedging a portion of the first poppet section into grooves of the second poppet section.

37. The method of claim 34, wherein:
the valve body comprises a first flow portion and a second flow portion;
the fixedly restraining comprises installing a pliable retainer ring in a groove of the first poppet section such that the retainer ring engages with an end of the second flow portion of the valve body.

38. The method of claim 34, further comprising:
assembling a fluid screen with respect to the valve body upstream from the second poppet section to screen out particulates, where fluid flow is from the first flow region to the second flow region.

* * * * *